(12) United States Patent
Rougeaux

(10) Patent No.: US 10,271,042 B2
(45) Date of Patent: Apr. 23, 2019

(54) CALIBRATION OF A HEAD MOUNTED EYE TRACKING SYSTEM

(71) Applicant: Seeing Machines Limited, Fyshwick (AU)

(72) Inventor: Sebastian Rougeaux, Turner (AU)

(73) Assignee: Seeing Machines Limited, Fyshwick (AU)

( * ) Notice: Subject to any disclaimer, the term of this patent is extended or adjusted under 35 U.S.C. 154(b) by 161 days.

(21) Appl. No.: 15/167,491

(22) Filed: May 27, 2016

(65) Prior Publication Data

US 2016/0353094 A1 Dec. 1, 2016

(30) Foreign Application Priority Data

May 29, 2015 (AU) .................................. 2015902010

(51) Int. Cl.
| | |
|---|---|
| *H04N 13/327* | (2018.01) |
| *H04N 13/344* | (2018.01) |
| *G02B 27/01* | (2006.01) |
| *G06F 3/01* | (2006.01) |
| *G06T 19/00* | (2011.01) |

(52) U.S. Cl.
CPC ....... *H04N 13/327* (2018.05); *G02B 27/0172* (2013.01); *H04N 13/344* (2018.05); *G02B 27/0101* (2013.01); *G06F 3/011* (2013.01); *G06T 19/006* (2013.01)

(58) Field of Classification Search
CPC .............. G02B 27/017; G02B 27/0172; G02B 27/0176; G02B 27/01; G02B 27/0101; G02B 2027/0174; G02B 2027/0178; H04N 13/0429; H04N 13/044; H04N 13/0425;
(Continued)

(56) References Cited

U.S. PATENT DOCUMENTS

2002/0113756 A1* 8/2002 Tuceryan ............. G02B 27/017
345/8
2003/0184860 A1* 10/2003 Hakkinen ................ G02B 7/12
359/480
(Continued)

FOREIGN PATENT DOCUMENTS

| CN | 10379267 | 5/2014 |
|---|---|---|
| DE | 102005037797 | 2/2007 |

(Continued)

*Primary Examiner* — Darlene M Ritchie
(74) *Attorney, Agent, or Firm* — Jason P. Mueller; Adams and Reese LLP

(57) ABSTRACT

Described herein is a method of calibrating a display in a head-mounted display system. The system includes a frame for maintaining the display in front of the user's eyes, and one or more lenses disposed between the display and the user's eyes. The method is configured to be performed by a computer processor associated with the head mounted display system and includes the steps of: a) generating a first image on the display based on predetermined parameters, the image including a two dimensional calibration structure identifiable by the user; b) receiving user input to generate a corrected image on the display; c) deriving calibration data based on the received user input and the predetermined parameters; and d) applying the calibration data to subsequent images generated on the display.

14 Claims, 9 Drawing Sheets

(58) Field of Classification Search
CPC .. H04N 13/344; H04N 13/327; G06T 19/006; G06F 3/013; G06F 3/011
See application file for complete search history.

(56) References Cited

U.S. PATENT DOCUMENTS

| | | | | |
|---|---|---|---|---|
| 2006/0072206 A1* | 4/2006 | Tsuyuki | G02B 27/0172 | 359/631 |
| 2006/0072215 A1* | 4/2006 | Nishi | G02B 13/06 | 359/708 |
| 2006/0250322 A1 | 11/2006 | Hall et al. | | |
| 2010/0079356 A1* | 4/2010 | Hoellwarth | G02B 27/017 | 345/8 |
| 2010/0091027 A1* | 4/2010 | Oyama | G02B 27/0068 | 345/581 |
| 2012/0162764 A1* | 6/2012 | Shimizu | G02B 7/12 | 359/473 |
| 2012/0293407 A1 | 11/2012 | Lee | | |
| 2013/0038510 A1 | 2/2013 | Brin et al. | | |
| 2013/0121559 A1 | 5/2013 | Hu et al. | | |
| 2013/0169943 A1 | 7/2013 | Wen et al. | | |
| 2013/0187943 A1 | 7/2013 | Bohn et al. | | |
| 2014/0043211 A1* | 2/2014 | Park | G02B 27/017 | 345/8 |
| 2014/0078023 A1* | 3/2014 | Ikeda | G02B 27/0025 | 345/8 |
| 2014/0153102 A1* | 6/2014 | Chang | G02B 27/0172 | 359/630 |
| 2014/0285429 A1* | 9/2014 | Simmons | G02B 27/225 | 345/156 |
| 2015/0049201 A1* | 2/2015 | Liu | H04N 17/00 | 348/189 |
| 2015/0193980 A1* | 7/2015 | Pedley | G06T 19/006 | 345/419 |
| 2016/0012643 A1 | 1/2016 | Kezele et al. | | |
| 2016/0091720 A1* | 3/2016 | Stafford | G02B 27/0172 | 345/8 |
| 2016/0270656 A1* | 9/2016 | Samec | A61B 3/085 | |
| 2017/0299869 A1* | 10/2017 | Urey | G02B 27/0172 | |

FOREIGN PATENT DOCUMENTS

| | | |
|---|---|---|
| WO | 2003/082083 | 10/2003 |
| WO | 2004/113991 | 12/2004 |
| WO | 2014/209706 | 12/2014 |
| WO | 2015/026629 | 2/2015 |
| WO | 2015/026645 | 2/2015 |
| WO | 2015/103621 | 7/2015 |
| WO | 2015/103623 | 7/2015 |

* cited by examiner

CALIBRATION OF A HEAD MOUNTED EYE TRACKING SYSTEM

CROSS REFERENCE TO RELATED APPLICATIONS

This application claims priority under 35 U.S.C. § 119 to Australian patent application 2015902010, filed May 29, 2015, the contents of which are incorporated herein by reference.

FIELD OF THE INVENTION

The present invention relates to a calibration system and method and in particular to a calibration system for a head-mounted display system. Particular embodiments of the invention are directed to a calibration system associated with a head-mounted display or helmet-mounted display, eyeglasses or visor or other display device, worn on the head or as part of a helmet, including one or two small displays with lenses.

BACKGROUND

A head-mounted display or helmet-mounted display, both abbreviated HMD, is a display device, generally worn on the head or as part of a helmet. Although they were initially developed for military use, HMDs are now used in commercial aircraft, automobiles and other, mostly professional applications. A primary application for HMDs is to create virtual reality environments for video games and to provide simulation and training. Use of the term "HMD" in this specification is intended to refer to any type of display device that is mounted to a user's head. These include, but not limited to virtual or augmented reality headsets such as Oculus Rift™ or Magic Leap™, helmet mounted displays and eyewear displays such as Google Glass™.

A typical HMD has either one or two small displays with lenses both embedded in a helmet, eyeglasses, visor or other similar device. An HMD may employ multiple displays to increase total resolution and field of view. The display units are generally miniaturized and may include cathode ray tubes (CRTs), liquid crystal displays (LCDs), Liquid crystal on silicon (LCos), or organic light emitting diodes OLEDs.

A small display lens is mounted in the HMD in front of one (monocular HMD) or each eye (binocular HMD) of a user. A binocular HMD has the potential to display a different image to each eye which can be used to show stereoscopic images.

The user's eye must be properly aligned with the HMD to assure optimum optical characteristics, sharpness and focus. Misalignment or helmet shift can cause an inaccurate or distorted picture. Head fit and facial position and other factors make helmet fitting a crucial factor in a user's ability to interface and interact with the system.

Misalignment can cause an inaccurate or distorted picture due to optical aberrations such as spherical aberration, optical coma, astigmatism and field curvature. When a user puts an HMD into a wearable position, the user's eye may not be properly aligned with the HMD providing sub optimal performance of the display and lens system. Misalignment may be caused by errors in pupil or intraocular distance, headset height or vertical offset and pupil distance from the screen. Additionally, distortions introduced by the display-lens system may be significant so as to require correction.

One option for alleviating the affects of a user's head/face/eye misalignment is by using a camera, illumination source and eye tracking system as a calibration method. A camera captures images of a user's eye(s). The images include a glint due to light from an illumination source reflecting from a user's eye directly back to the camera. Various image processing methods for identifying and locating a glint and pupil within captured images of a user's eye are known.

In a typical camera tracking system used for calibration, the user may be asked to fix his or her gaze upon certain points in a display. At each displayed coordinate location, a corresponding gaze direction may be computed.

U.S. Pat. No. 5,481,622 to Gerhardt et al. entitled "Eye Tracking Apparatus and Method Employing Grayscale Threshold Values" teaches a head-mounted eye-tracking system. The user gazes at a cursor placed at a known position in a display screen, and the invention determines the pupil center position. Cameras capture images that include reflections from the user's cornea. The system includes a set of light sources within the user's view of the display screen. The light source produces a glint as seen by the camera and the system determines a user's eye position for calibration.

Camera systems may improve display accuracy. However, a reflection may be distorted from each cornea considering curvature variations based on different relative positions of the camera or light source relative to a user's eye. Also, the user might also be asked to click a mouse button or identify a cursor after gazing at an image. One problem associated with this approach is that it relies heavily on the user's attention and the user may look away then click the mouse button or select the cursor position.

In addition, using a camera and eye tracking system may be computer intensive, as a camera system needs to identify the user's pupil position for each frame. The system is expensive based on the requirement for a camera, illumination source and additional processor power required for the eye tracking system.

Any discussion of the prior art throughout the specification should in no way be considered as an admission that such prior art is widely known or forms part of common general knowledge in the field.

SUMMARY OF THE INVENTION

In preferred embodiments of the present invention, a user looks at an HMD display device and interacts with a calibration procedure. The calibration procedure then simulates what each of a user's eyes would see through each lens. The calibration procedure identifies or extrapolates a particular eye position and optical distortion as a result of lens misalignment or helmet shift and corrects for that particular eye position, thus reducing misalignment error to an acceptable level.

The current invention provides for the implementation of an HMD calibration system without a camera. There are no camera associated eye tracking calculations required and the cost associated with a camera and illumination source is eliminated.

In accordance with a first aspect of the present invention there is provided a method of calibrating a display in a head-mounted display system, the system including a frame for maintaining the display in front of the user's eyes, and one or more lenses disposed between the display and the user's eyes, the method including the steps of:

a) generating a first image on the display based on predetermined parameters, the image including a calibration structure identifiable by the user;
b) receiving user input to generate a corrected image on the display;
c) deriving calibration data based on the received user input and the predetermined parameters; and
d) applying the calibration data to subsequent images generated on the display.

In one embodiment the predetermined parameters include a lens model. In one embodiment the predetermined parameters include parameters of the one or more lenses. In one embodiment the predetermined parameters include a predetermined eye position of the user's eyes. In one embodiment the predetermined parameters include distortion parameters of the one or more lenses. In one embodiment the predetermined parameters include an eye positions relative to focal points of the one or more lenses.

In one embodiment the received user input is provided from a touchpad. Preferably the touchpad is mounted on the frame. In another embodiment the received user input is provided by an external input device in electrical or wireless communication with the head-mounted display system.

In one embodiment the received user input includes manipulating the first image to reduce visual distortions in the calibration structure.

In one embodiment the calibration data includes a calibration function. The calibration function preferably includes a plurality of reference image points disposed at different positions across the display.

In one embodiment the calibration data includes distortion parameters which correct for offsets in the eye position relative to the one or more lenses. In one embodiment the calibration data corrects for focal position misalignments. In one embodiment the calibration data corrects for optical aberrations and distortions arising from the one or more lenses.

In one embodiment the calibration structure is two dimensional. In one embodiment the calibration structure includes a two dimensional grid. In another embodiment the calibration structure is three dimensional.

In accordance with a second aspect there is provided a computer processor configured to perform a method according to the first aspect.

In accordance with a second aspect there is provided head-mounted display system including:
  a frame for maintaining the display in front of a user's eyes;
  a display for generating images for viewing by the user's eyes;
  one or more lenses disposed between the display and the user's eyes;
  a processor for generating a first image on the display based on predetermined parameters, the image including a calibration structure identifiable by the user, deriving calibration data based on received user input and the predetermined parameters, and applying the calibration data to subsequent images generated on the display to calibrate the images for viewing by the user's eyes; and
  a user interface for allowing provision of user input to modify the first image on the display.

BRIEF DESCRIPTION OF THE FIGURES

Preferred embodiments of the disclosure will now be described, by way of example only, with reference to the accompanying drawings in which.

DESCRIPTION OF THE INVENTION

Figure 1:
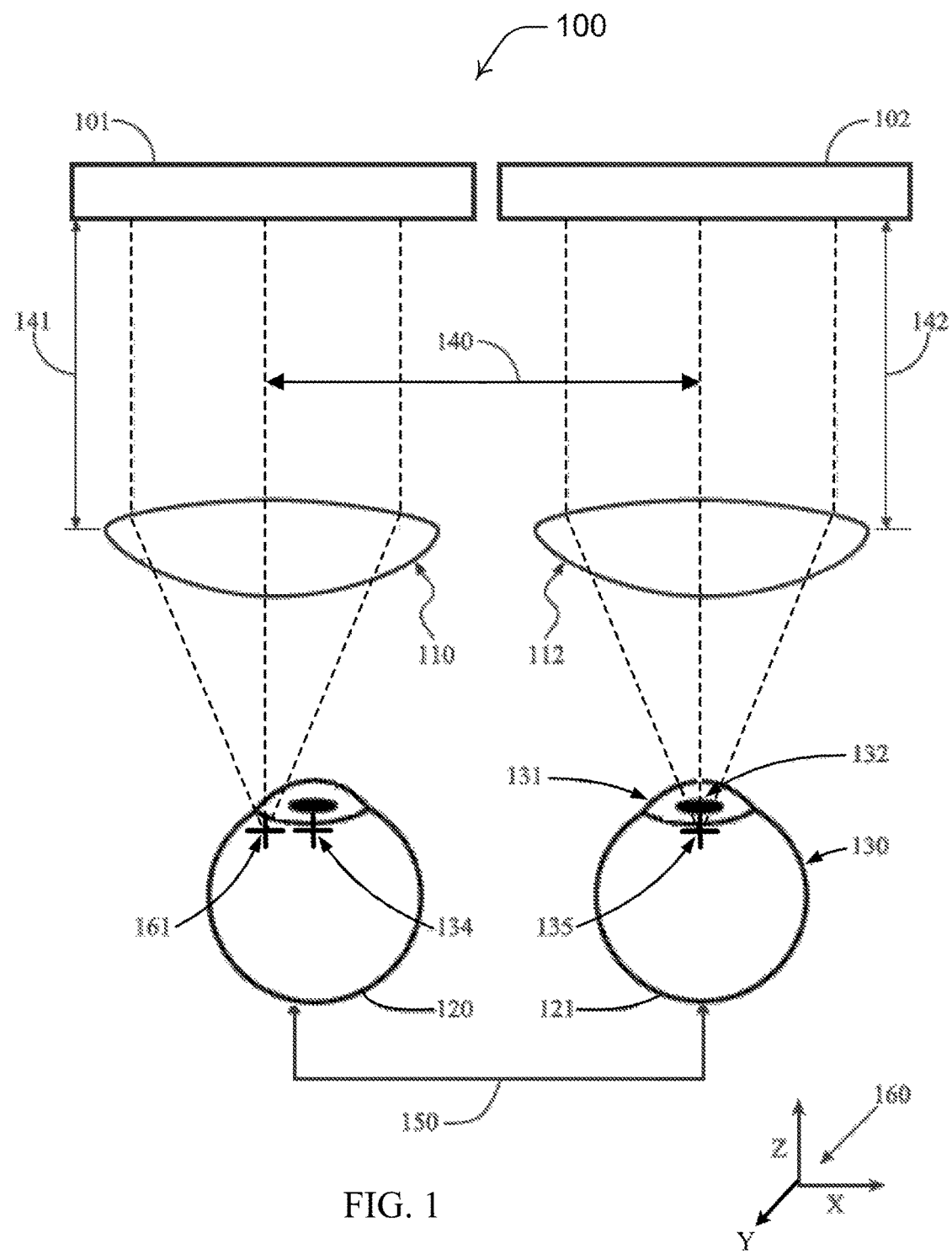
FIG. 1 illustrates a schematic plan view of a display-lens system and exemplary user eye positions.

With reference to FIG. 1, components within or associated with a head-mounted display (HMD) 100, or other similar devices, include at least one or a plurality of displays 101, 102 and lenses or a lens system 110, 112. The display and lens components are incorporated into an HMD, eyeglasses or visor or other display device that is worn on the head or as part of a helmet by suitable mounting or adhesive during construction. The positions of lenses 110, 112 and displays 101, 102 are fixed in the HMD and the distance 140 between each lens is predetermined and fixed during manufacture. Distances 141, 142, between the lenses 110, 112 and displays 101 102 are also predetermined and fixed during manufacture of the HMD.

Each user's eye 120, 121 includes the eyeball or sclera 130, a substantially spherical segment-shaped cornea 131, and a pupil 132. Each of the user's eyes 120, 121 also include an eyeball nodal point 134, 135. For different people, the distance between their eyes, size of the eye and nodal point may be different in comparison to other users. Note that multiple eye and cornea models are known in the art and each or all such models may be employed by the present invention. Close proximity of a user's eyes 120, 121 to the lens system or lenses 110, 112, introduces optical distortions when either of the user's eyes 120, 121 are misaligned with the lens 110, 112 system. Each time a user puts on or wears an HMD, the alignment between the eyes and the lenses may be different in either the X, Y or Z direction. In addition, an inter ocular or inter-pupil distance 150 is not the same for each person so it is almost impossible to be perfectly aligned with the optical axis of both lenses for the left and right eye.

Referring still to FIG. 1, in one example, eye alignment (right side) and eye misalignment (left side) are illustrated. The view, as illustrated in FIG. 1, is from a top-down perspective and illustrates image distortion due to a user's inter-pupil distance 150 mismatched to the distance between each fixed lens 140. In an X-Y-Z plane 160, the distance between a user's eye 120, 121 and lens 110, 112 is parallel to the Z axis. Similarly, the inter-pupil distance 150 runs parallel to the X axis. Referring to the right eye 121, the fixed lens 112 and fixed display 102 are properly aligned with the users eye 121. The focal point of the lens 112 correspondingly matches with the eyeball nodal point 135. In contrast, for the left eye 120, the fixed lens 110 and fixed display 101 are misaligned with the users eye 120 in the X axis. The focal point 161 of the lens 110 is misaligned with the eyeball nodal point 134, thus producing an optical distortion and image distortion from a user's perspective.

Figure 2:
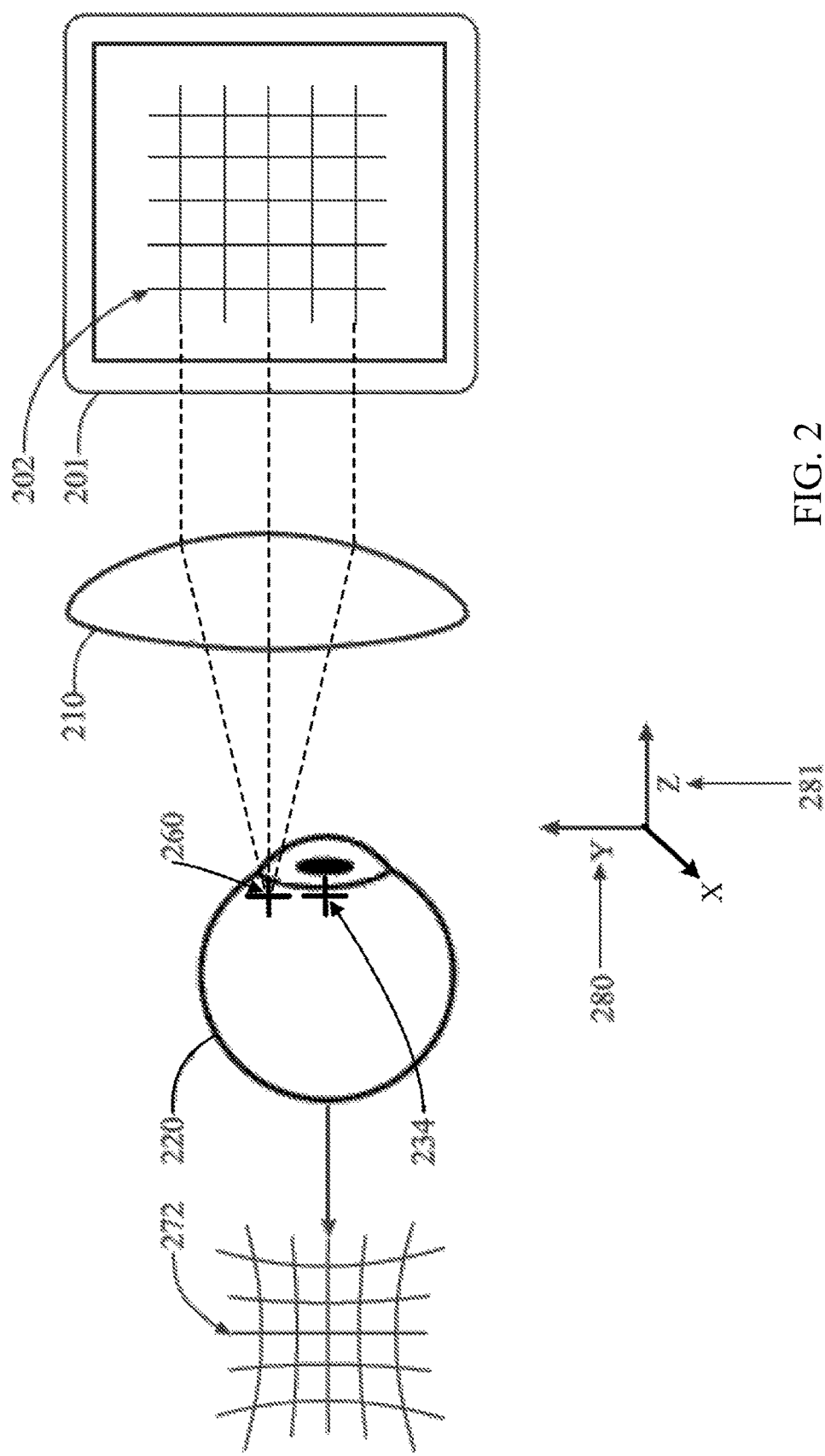
FIG. 2 illustrates a schematic side view of another display-lens system and exemplary user eye positions.

Referring now to FIG. 2, in another example, a misalignment in the vertical or Y axis 280 is shown. The Y axis represents the vertical height of a user's eyeball nodal point in comparison to the focal point of a display and lens system. For illustrative and clarity purposes only, a display 201 is shown rotated parallel to a user's line of sight perspective to show a better representation of a viewable image on the display.

The user's eye example, as illustrated in FIG. 2, is from a side perspective and illustrates a source or cause of image distortion due to, for example, an HMD designed for a user having a particular head size and a current user having a smaller head size. Components within an HMD include at least one display 201 and at least one lens 210. The lens 210 and display 201 are a stationary part of the HMD. In this example, the current user's eye 220 position and eye nodal point 234 will be higher than the intended HMD position of the display-lens 201, 210 nodal point 260. In this example, the user will see a distorted image 272. In an additional example, a distance error (parallel to the Z axis 281) between a users eye and an HMD display-lens system will also result in an optical misalignment and image distortion from a user's perspective.

When a user looks at display 201 and the user's eyes are perfectly aligned, they will see a straight grid. If the user's eyes are not perfectly aligned, they will see distortion 272 in the image. Referring still to FIG. 2, a straight grid pattern 202 on the display 201 will have apparent or perceived distortion based on the misalignment of the eye with the lens and display system. An exemplary grid pattern 202 image is presented to the user on display 201. When the user's eye 220 is misaligned as described above, the user sees a distorted image. An example of a distorted image 272 that the user may perceive or see is shown.

Figure 3D:
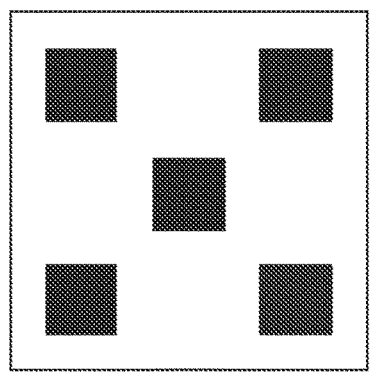
FIGS. 3A-H show possible exemplary test patterns which can be displayed on a display of a HMD.
Figure 3C:
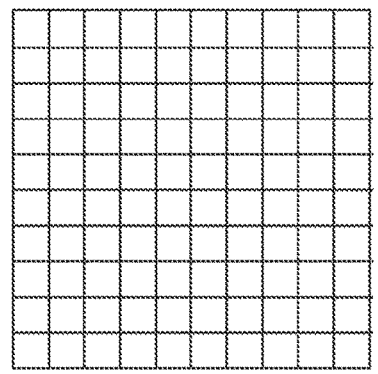
Figure 3B:
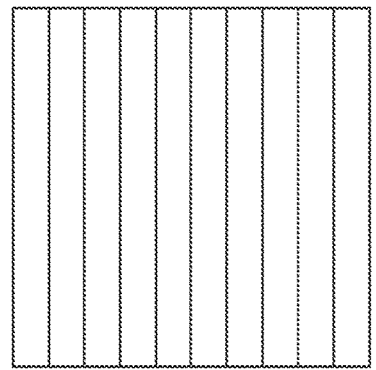
Figure 3A:
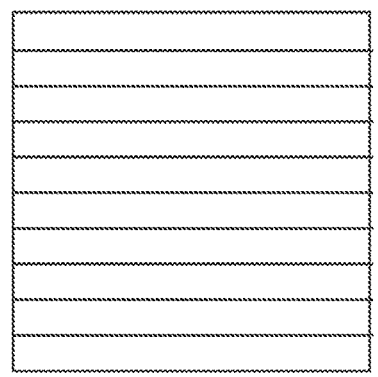
Figure 3H:
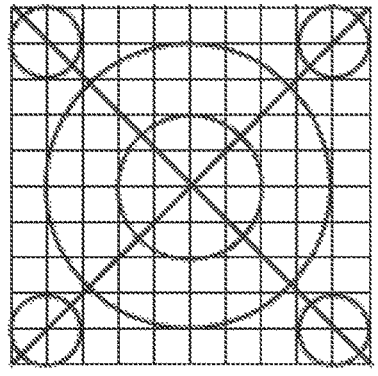
Figure 3G:
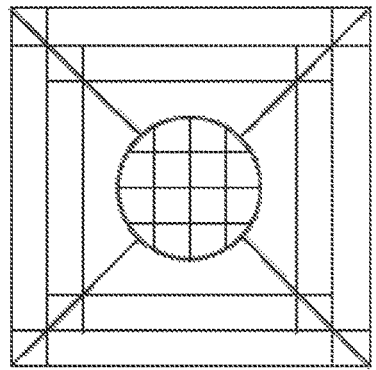
Figure 3F:
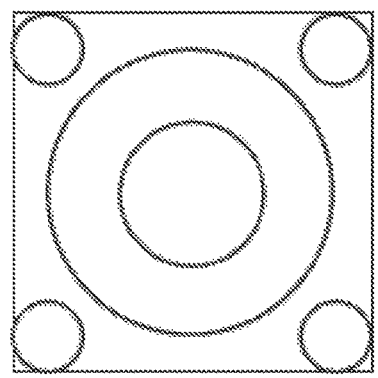
Figure 3E:
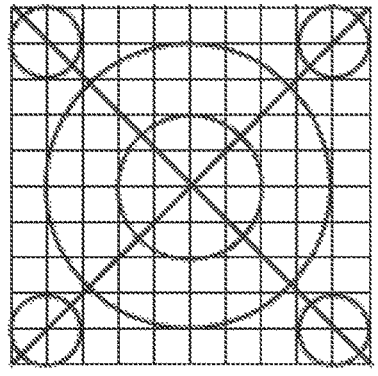

During a calibration procedure, a variety of different test images, structures or patterns may be used. Generally, test patterns include straight, uniformly spaced lines, for example in FIGS. 3A-C, although other patterns may be used, for example uniformly spaced squares as in FIGS. 3D, E, or circular patterns, for example in FIGS. 3F-H. In other embodiments, commonly recognized images may also be used, for example images of faces, human bodies, or images containing repeating patterns.

An HMD which includes a lens-display system as described above may also contain or be coupled to a system used to generate the images or patterns.

Figure 4:
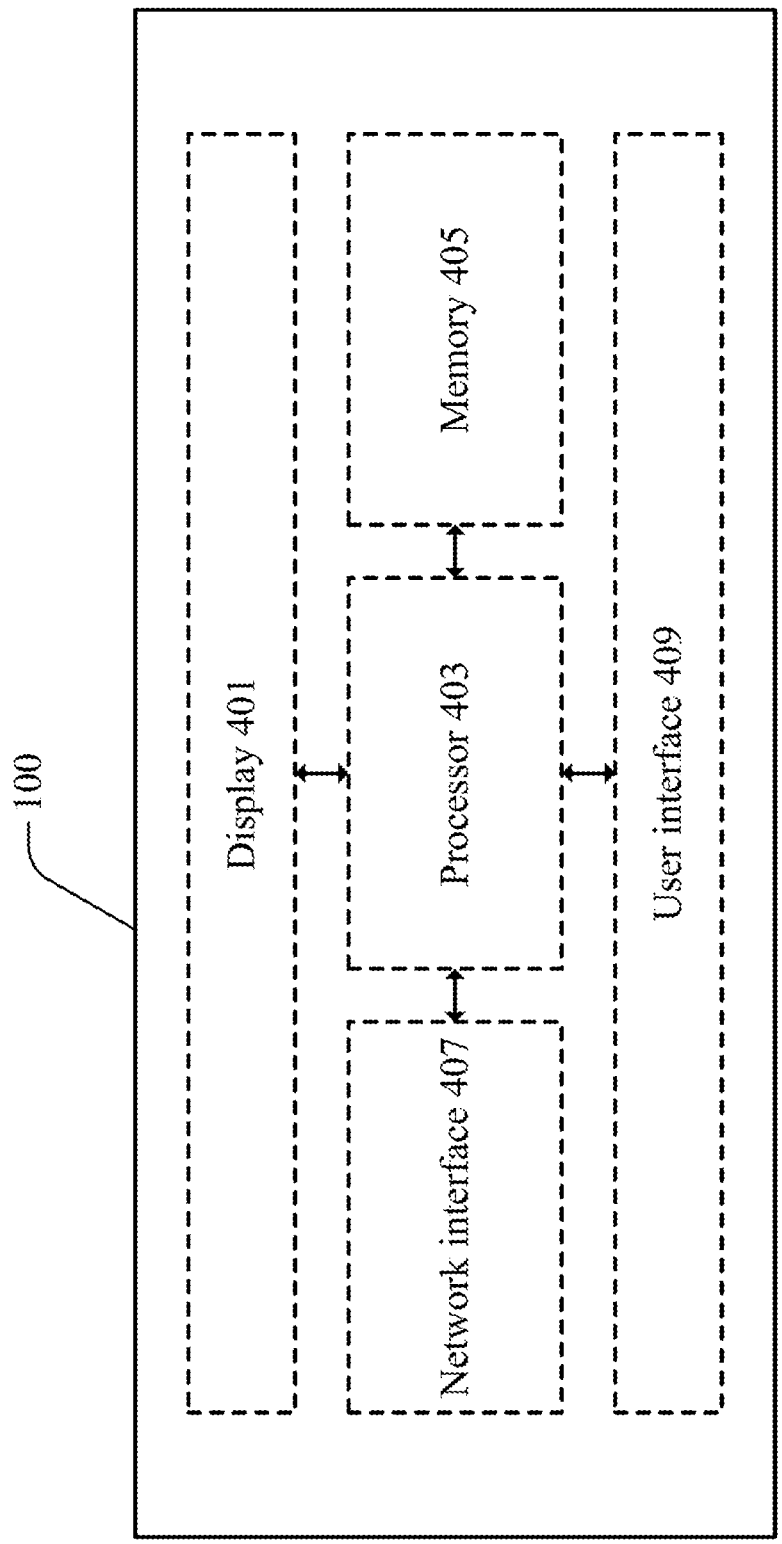
FIG. 4 shows a schematic block diagram of the primary electronic components of an exemplary HMD.
Figure 8:
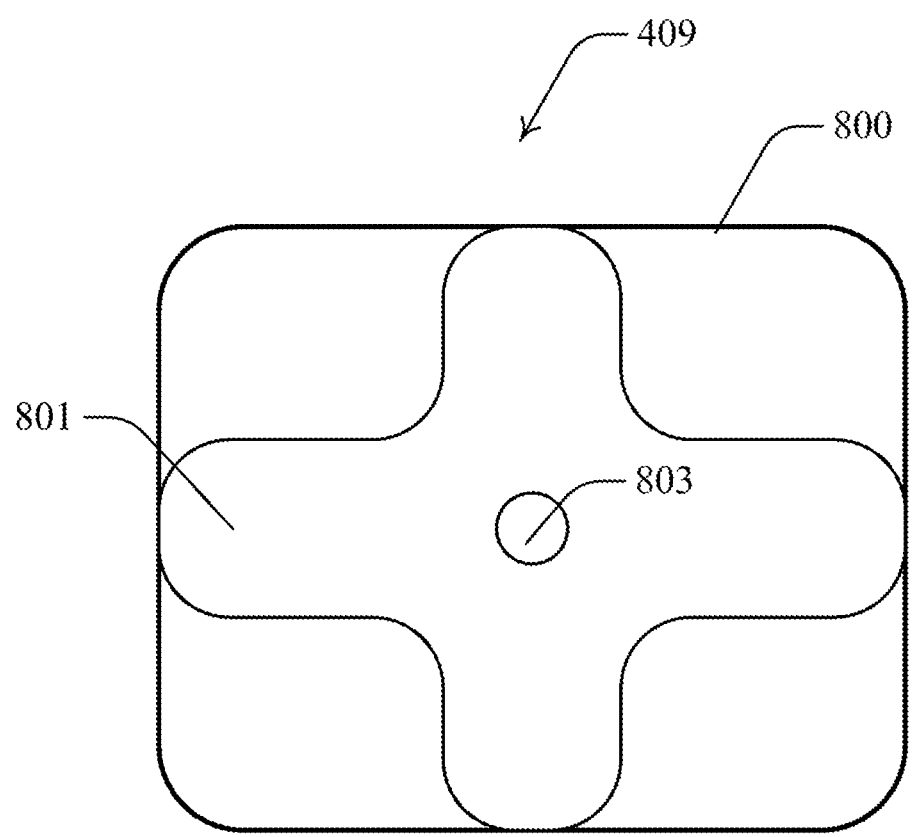
FIG. 8 illustrates an exemplary user interface used in the invention.

Referring to FIG. 4, a schematic block diagram of the primary electronic components of HMD system 100 is illustrated. HMD 100 includes a display 401 such as an LCD, a processor 403 such as a microprocessor linked to a memory device 405 such as read-only-memory (ROM), programmable read-only memory (PROM), erasable programmable read-only memory (EPROM), electrically erasable programmable read-only memory (EEPROM) or flash EEPROM, a network interface 407 such as a wireless communications device or network connection port and a user interface 409 such as a keypad (as illustrated in FIG. 8). Processor 403 is adapted through hardware and/or software control to control the display 401, access memory device 405, interpret input from user interface 409 and selectively transmit and receive data through network interface 407. In some embodiments, both display 401 and user interface 409 are combined into a single touchscreen display device.

The following exemplary systems will be described with reference to the components of FIG. 4. Processor 403 and memory device 405 may be utilized in a parallel processing arrangement to be accessed by multiple devices and used for multiple functions simultaneously.

Figure 5:
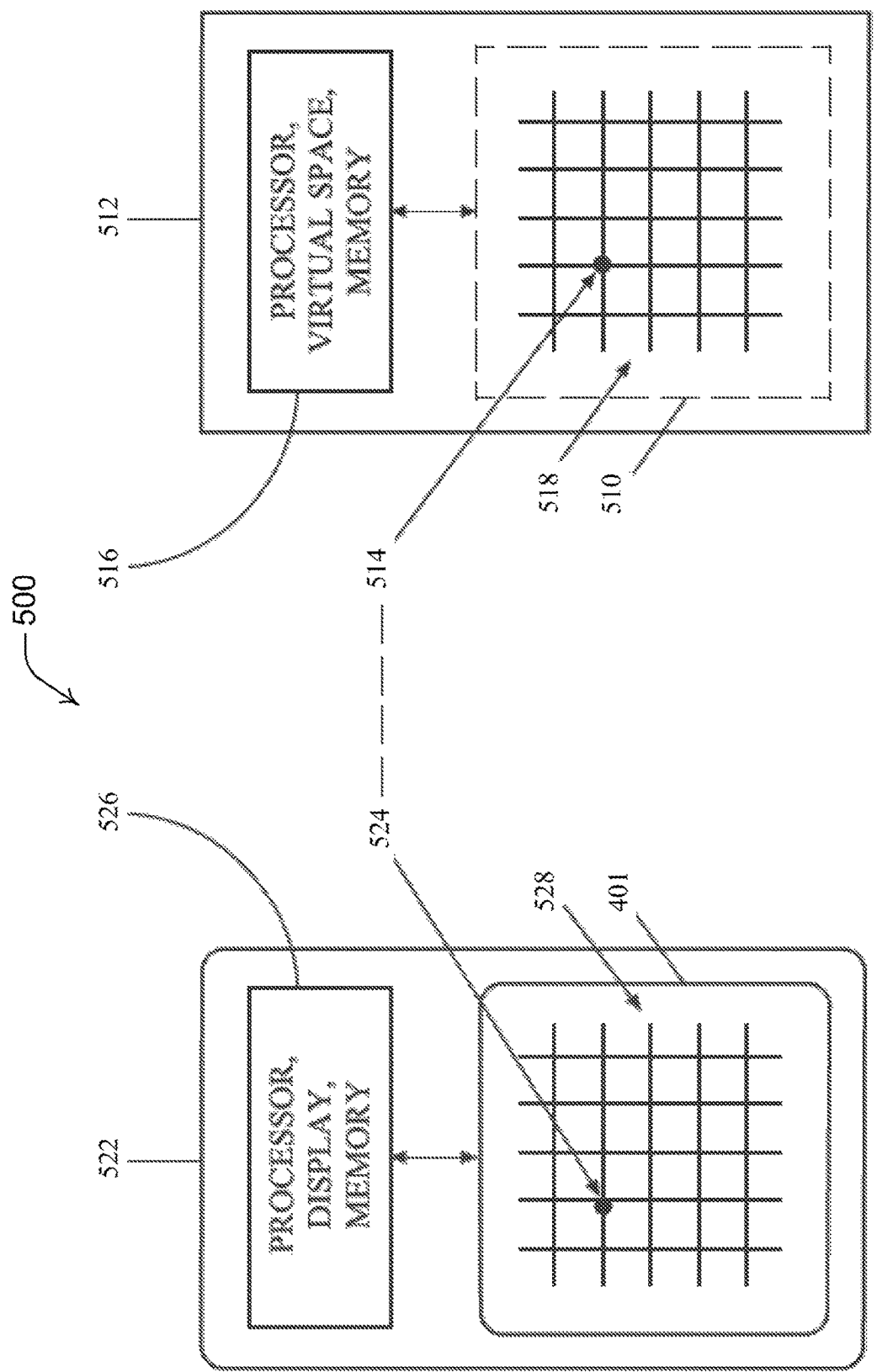
FIG. 5 illustrates a functional block diagram of an image in virtual space and a one-to-one correlation with an image displayed on an HMD display.

Referring to FIG. 5, there is illustrated a simplified, overall functional block diagram of an imaging system 500 of an HMD system without calibration functionality. An image generating system 512 defines a virtual image space or virtual plane 510 in which a virtual image is defined. The image generating system 512 includes a processor and memory 516, leveraged as part or all of processor 403 and memory device 405, that is used to generate and/or manipulate the virtual image defined in the virtual space or virtual plane 510. Virtual space or virtual plane 510 defines an image coordinate system which includes a two or three dimensional array of data 518 representing virtual image points or pixels that are stored in memory 405. A two dimensional virtual plane 510 and a single virtual point 514 is shown for illustrative purposes. Although virtual plane 510 is represented graphically in FIG. 5, it will be appreciated that plane 510 and data 518 are not manifested physically and are representative of data stored in memory 405 and manipulated by processor 403.

A display system 522 includes display screen 401, for example a liquid crystal display. FIG. 5 illustrates a planar or coplanar screen however, that is not a limitation of the present invention and other devices having curvature or other features could readily be implemented by the person skilled in the art. The display system 522 also includes a processor and memory system or memory device 526 leveraged as part or all of processor 403 and memory device 405, which stores or manipulates a display image 528. The display image includes multiple display points and each display point, for example point 514, will have a corresponding point 524 located in the display system 522. In particular, the virtual plane 510 represents the raw image data and display image 528 represents the corresponding rendered image on display 401. Image point 524 represents the image pixel corresponding to image data point 514. FIG. 5 illustrates a one to one relationship or reference between each virtual point 514 and each corresponding screen point 524 (or pixel).

Figure 6:
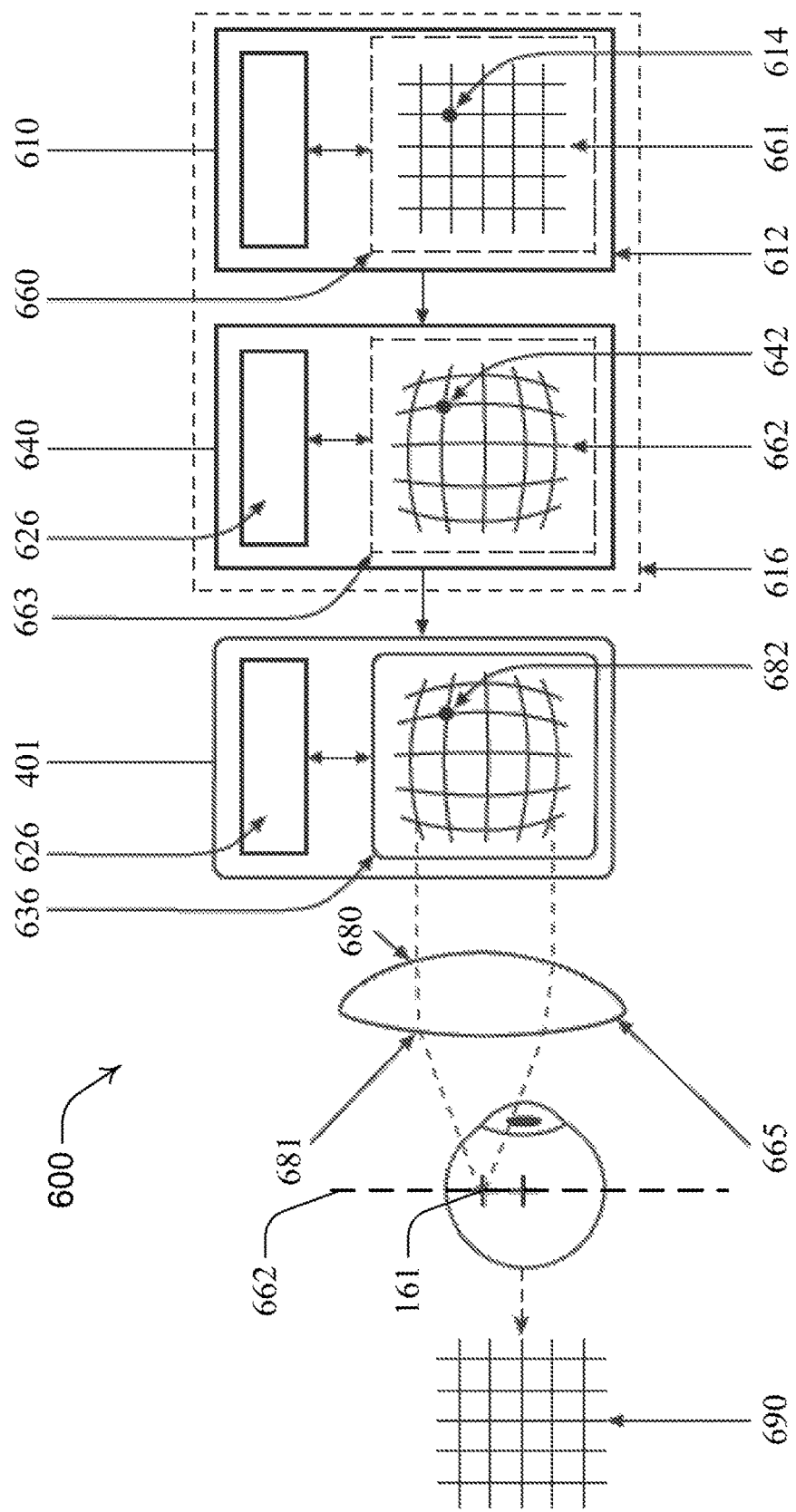
FIG. 6 illustrates a) a functional diagram of an image generator showing an image in virtual space, b) a calibration function and c) corrected image in an image space.

Referring to FIG. 6, there is illustrated a functional diagram of an image generation system 600 of a HMD including calibration capability. System 600 includes an image generating system 612 defining a virtual image plane 610 and a processor and memory system or memory device 626 leveraged as part or all of processor 403 and memory device 405. System 612 is similar in function to system 512 and plane 610 is similar to plane 510 of FIG. 5. Virtual plane 610 represents memory in memory device 405 which stores a two or three dimensional array of image data. System 600 provides for implementing a compensation or calibration process by defining a calibration plane 640 as described in more detail below. Preferably, the calibration process is performed by processor 403 and memory 405 operating together as image generating system 612. However, the calibration process may be performed y one or more hardware circuits, software or firmware code, executed or implemented by specific circuits embedded on a microchip of the HMD. Like virtual plane 610, calibration plane 640 is not manifested physically but is a functional step representative of data stored in memory 405 and manipulated by processor 403 to calibrate an image.

Figure 7:
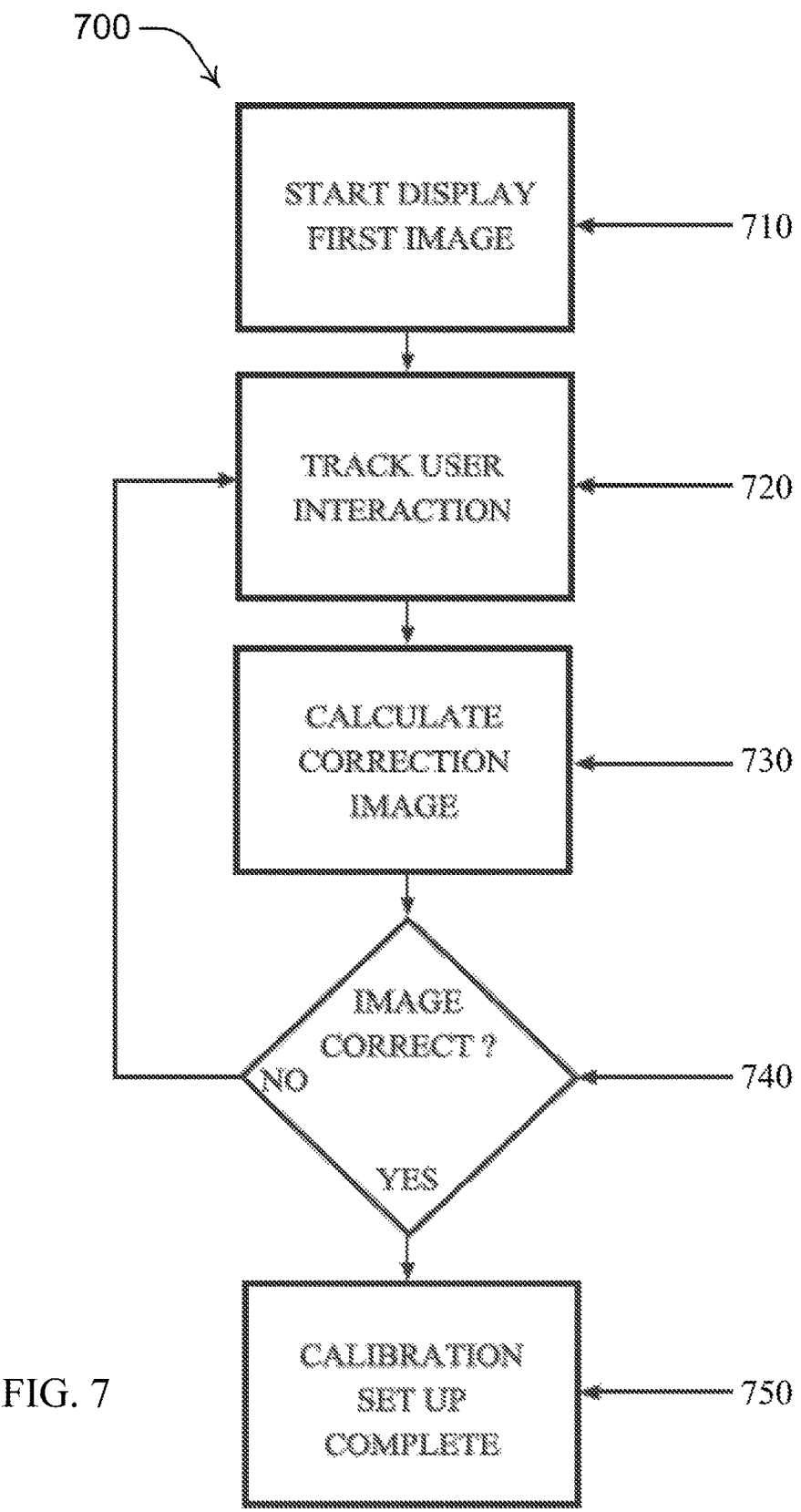
FIG. 7 illustrates a flow chart of the functional steps performed by a HMD system of the present invention to calibrate the HMD system.

FIG. 7 illustrates a flow chart of the functional steps in a calibration procedure 700 performed by a HMD system to calibrate the HMD system. Referring to both FIG. 6 and FIG. 7, the calibration procedure 700 is commenced at step 710 by first controlling processor 403 to generate an image of a visual calibration function 660 to be displayed on screen 401. The calibration function 660 is loaded or generated in the virtual image plane 610 and represented as a test pattern image 661. The test pattern image 661 is indicative of what should be viewed by the user if the user's eyeball 620 location is aligned with the ideal focal point location of the HMD system. In one embodiment, this ideal eyeball positioning is initially assumed, prior to or at step 710, to provide a reference point for further calibration. In other embodiments, other initial conditions are used. For example, an initial predetermined eye position may be based on an algorithmic function, a random location, a previous or average eyeball location for a specific user, or an average eyeball location for all users.

In the calibration plane 640, a calibration image 663 is loaded or generated including an image pattern 662 that has a one to one pixel correspondence with the test pattern image 661 in the virtual space 610 and a true representation of test pattern image 661 as displayed on the display 401 as display image 690. The true representation of test pattern image 661 is not a direct reflection of that in the virtual space 610 as the images are always rendered 'distorted' on display 401, even when the eye is perfectly aligned as the lens system inherently performs distortion on the images. The required distortion parameters are computed from the assumption that the nodal point of the eye lies at the focal point of lenses 110 and 112 of FIG. 1. The calibration image 663 represents calibration function 660 as modified by the lens system (using the coded lens model) and the initial predefined position of the user's eyes relative to the ideal lens focal point. That is, when the eyes are not properly aligned, the rendering of the image needs to be further adjusted to account for the additional distortions by the offset from the ideal eye positioning.

The characteristics of the test pattern image 661 are generally repeating and/or symmetrical in nature or indicative of familiar or well-known shapes so as to more easily identify the type and amount of optical aberration that is imposed on the projected images by the lens system. The particular type of test pattern to use is determined based on the known properties of the lens system in use in the HMD, which is coded as a lens model (including the position and focal power of the lens(es) in the HMD system), and a predetermined user eye position (in the X, Y and Z axes). Exemplary test pattern images are illustrated in FIG. 3.

At step 720, the user views the resulting display image 690 on display 401 and is able to provide input or feedback through user interface 409 to adjust or correct the calibration image 663 for the optical aberrations present.

In one embodiment, the user interface 409 is a touch sensitive keypad 800 as illustrated in FIG. 8. Keypad 8 has a substantially cross-shaped pad interface 801 having eight directional sensors for sensing directional inputs corresponding to up, down, left, right and the four diagonal directions. A button 803 is located in the center of keypad 800 for allowing a user to select an action such as to confirm that the displayed image is undistorted.

The user manipulates the directional sensors on interface 801 to vary the shape of the pattern projected on the display 301. Due to the repeating, symmetrical or familiar nature of the test pattern, the user is able to identify what the undistorted pattern should represent and is able to relatively simply adjust the viewed pattern to match the undistorted pattern. Through manipulation of keypad 800, the user is able to perform functions such as pan and zoom to simulate adjustment of the position of the user's eyes about the image plane 662. Adjustment in the correct direction will reduce the distortion to the image and adjustment in the incorrect direction will further distort the displayed image (say, by adding positive or negative curvature to the viewed test pattern). To assist the user, verbal instructions may be provided to the user through a speaker of the HMD or headphones in operative association with the HMD.

Figure 9:
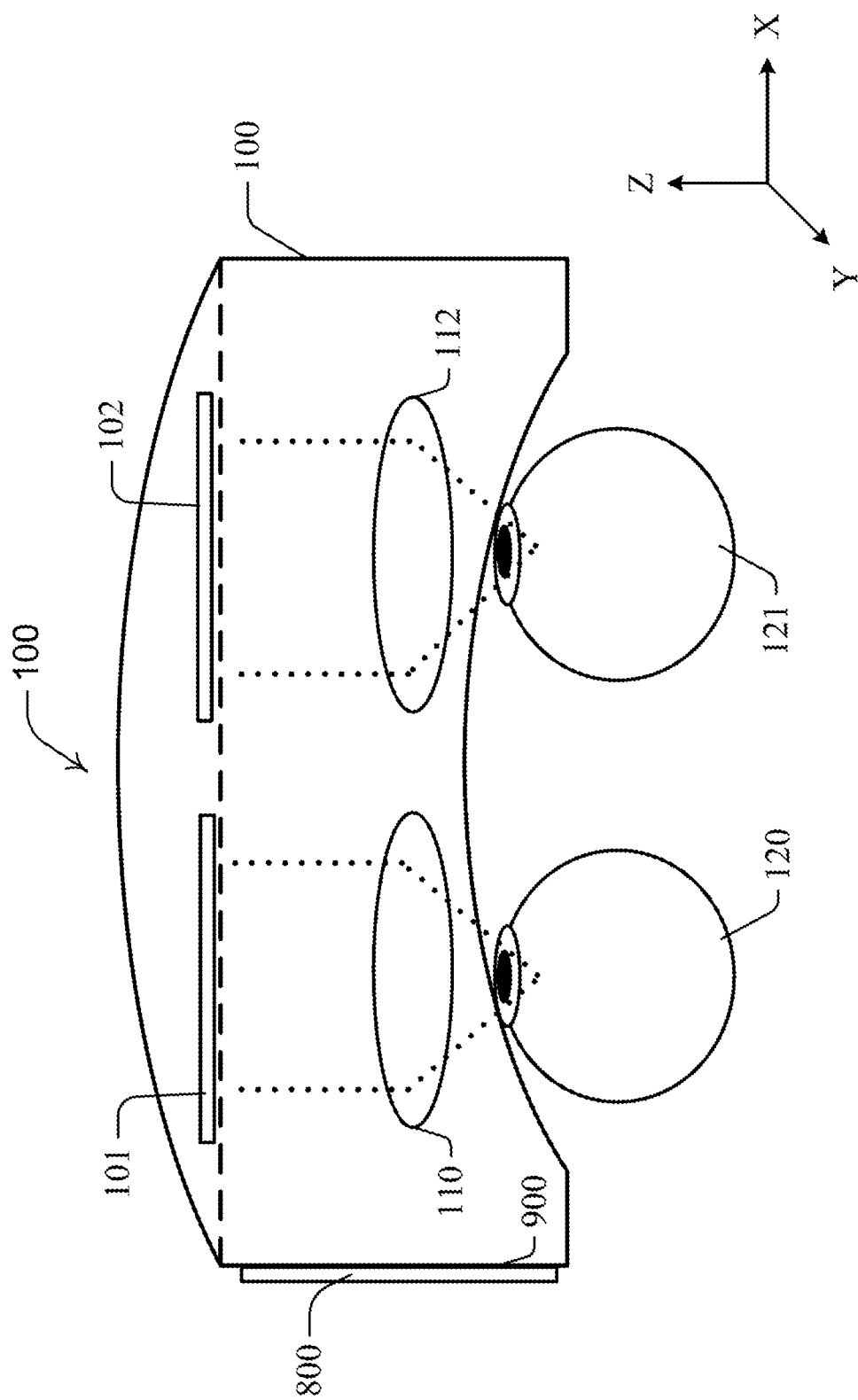
FIG. 9 illustrates a plan view of a HMD having a user interface keypad mounted to one side for allowing user feedback in a calibration procedure.

Keypad 800 is mounted to a side 900 of HMD 100, as illustrated in FIG. 9, and operatively associated with processor 403 to receive the user input. However, in other embodiments, keypad 800 is disposed on other regions of HMD 100. In the case where the HMD includes glasses, the keypad 800 may be mounted to an arm of the glasses. In one embodiment, user input is provided through a keypad or touch interface that is connected to HMD 100 through network interface 407.

In an alternative embodiment, keypad 800 is used to generate and display at least one indicator, slider or multiple indicators on display 401, which can be used to designate the position of certain features in the test pattern as viewed at the image plane. In other embodiments, other user input devices may be used such as a mouse, a touchpad, buttons, sliders or dials may be used.

In response to the user feedback, at step 730, processor 403 sequentially adjusts calibration image 663 without modifying the image stored in the virtual plane. The calibration image 663 represents a two or three dimensional array data points which map the points of the calibration function 660 in the virtual plane 610 to corresponding pixels on display 401. From the system perspective (as opposed to the user's perspective, the directional user feedback controls the X, Y and Z positional offset of the nodal point of the user's eye in relation to the focal point of the lenses. From those offsets, the distortion parameters can be recomputed and new distorted images rendered on the screens (this can be achieved by ray-tracing algorithms).

The process of receiving user feedback through interface 801 continues until, at step 740, the calibration function appears substantially undistorted (the displayed image closely represents the image in virtual space). Here, the user selects the button 803 to confirm that the image appears undistorted. Selection of button 803 triggers storage of the current calibration image 663 which stores a two-dimensional array of calibration data (including the final distortion parameters) to apply to subsequent images to be projected on display 401. Using a predefined lens model, the actual position of the user's eyes relative to the ideal lens focal point can be extrapolated from the calibration image 663.

At step 750, the calibration process is complete and normal operation of the HMD can commence. Under normal operation, the calibration function 660 is replaced by input image data to be projected on display 401. The stored calibration image data is applied on a pixel-by-pixel basis to the generated or loaded image data in real or near-real time to map the image data generated in virtual plane 610 to the image plane 662 to correct for the optical aberrations during operation of the HMD 100. The user perceives an image on display 401 that closely represents the images generated in virtual plane 610.

Properties of a particular lens 665 or lens system are known. Therefore, distortion parameters are known, pre-computed for the particular lens 665 and display 401 system in the HMD. Based on lens properties and known distortion parameters and identifying an eye position relative to the lens focal point at image plane 662 provides the nature and degree of the distortion due to a misalignment or positional error. The above described calibration process, using the predetermined starting point for the user's eyeball location, provides a calculated counteracting distortion for that particular eyeball location based on the particular lens system used in the HMD.

In one embodiment of the invention, a ray tracing routine is used by the calibration procedure to determine an adjustment or degree of correction. The calibration procedure, for each eye position, models or calculates a lens entry point 680, a lens exit point 681 and an adjusted screen point 682 that corresponds with a virtual point 614 and can be mapped by a calibration point 642.

In one embodiment of the invention, the calibration plane 640 and virtual plane 610 are maintained or manipulated by processor 403 and memory 405 as a single functional unit 616. In alternative embodiments, the calibration image 663 is stored in a memory 636 of display 401. It will be apparent to those skilled in the arts that a multitude of equivalent embodiments or implementations are possible, so long as the calibration plane 640 interacts between a virtual plane 610 and a display system 622.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A method of calibrating a display in a head-mounted display system, the system including a frame for maintaining the display in front of the user's eyes, and one or more lenses disposed in a fixed position between the display and the user's eyes, the method including the steps of:
    (a) generating first image data on the display based on predetermined lens parameters, wherein the first image data includes a two or three dimensional calibration structure identifiable by the user and wherein the first image data is indicative of what would be viewed by the user if the user's eyeball location is aligned with a focal point of the one or more lenses;
    (b) generating a calibration image on the display having a one-to-one pixel correspondence with the first image data and including a calibration function representing a modification of the first image data by the one or more lenses, based on the predetermined lens parameters, and an initial predefined position of the user's eyes relative to the focal point of the one or more lenses;
    (c) receiving user input from an interface on the head-mounted display system to sequentially adjust the calibration image, in at least two dimensions, without modifying the first image data by calculating a lens entry point, a lens exit point, and an adjusted image data point that corresponds with a virtual point to be mapped by the calibration function;
    (d) storing the calibration function in memory when the calibration image appears undistorted to the user; and
    (e) applying the calibration function to subsequent images generated on the display to thereby at least partially correct for distortion of the subsequent images based on the predetermined lens parameters and the actual position of the user's eyes.

2. The method according to claim 1 wherein the predetermined parameters include distortion parameters of the one or more lenses.

3. The method according to claim 1 wherein the received user input is provided by an external input device in electrical or wireless communication with the head-mounted display system.

4. The method according to claim 1 wherein the received user input includes manipulating the first image to reduce visual distortions in the calibration structure.

5. The method according to claim 1, wherein the calibration function includes a plurality of reference image points disposed at different positions across the display.

6. The method according to claim 1 wherein the calibration function at least partially corrects for focal position misalignments.

7. The method according to claim 1 wherein the calibration function at least partially corrects for optical aberrations and distortions arising from the one or more lenses.

8. The method according to claim 1, wherein the method is performed by a computer processor.

9. The method according to claim 1 wherein the received user input is provided from a touchpad.

10. The method according to claim 9 wherein the touchpad is mounted on the frame.

11. The method according to claim 1 wherein the calibration structure is two dimensional.

12. The method according to claim 11 wherein the calibration structure includes a two dimensional pattern.

13. The method according to any one of the preceding claims wherein the calibration structure is three dimensional.

14. A head-mounted display system including:
    a frame for maintaining the display in front of a user's eyes;
    a display for generating images for viewing by the user's eyes;
    one or more lenses disposed in a fixed position between the display and the user's eyes, wherein a focal point of the one or more lenses is misaligned with at least one of the user's eyes, producing an optical distortion and an image distortion from the user's perspective;
    a processor for generating:
        first image data based on predetermined lens parameters, the first image data including a two or three dimensional calibration structure identifiable by the user and wherein the first image data is indicative of what would be viewed by the user if the user's eyeball location is aligned with the focal point of the one or more lenses; and
        a calibration image on the display having a one-to-one pixel correspondence with the first image data and including a calibration function representing a modification of the first image data by the one or more lenses, based on the predetermined lens parameters, and an initial predefined position of the user's eyes relative to the focal point of the one or more lenses;
    a user interface for allowing provision of user input to sequentially adjust the calibration image, in at least two dimensions, without modifying the first image data by calculating a lens entry point, a lens exit point, and an adjusted image data point that corresponds with a virtual point to be mapped by the calibration function; and
    memory for storing the calibration function in memory when the calibration image appears undistorted to the user, wherein the calibration function is applied to subsequent images generated on the display to thereby modify the first image on the display to at least partially correct for distortion of the subsequent images based on the predetermined lens parameters and the actual position of the user's eyes.

\* \* \* \* \*